S. H. WADE.
Cotton-Planting Attachment to Harrows.

No. 160,975.  Patented March 16, 1875.

WITNESSES
Henry N. Miller
C. L. Evert

INVENTOR
Seaton H. Wade.
per Alexander Mason
ATTORNEYS

THE GRAPHIC CO. PHOTO-LITH. 39 & 41 PARK PLACE, N.Y.

UNITED STATES PATENT OFFICE.

SEATON H. WADE, OF CHAPEL HILL, ASSIGNOR OF ONE-HALF HIS RIGHT TO WILLIAM J. COVINGTON, OF CRYSTAL SPRINGS, MISSISSIPPI.

IMPROVEMENT IN COTTON-PLANTING ATTACHMENTS TO HARROWS.

Specification forming part of Letters Patent No. 160,975, dated March 16, 1875; application filed January 28, 1875.

*To all whom it may concern:*

Be it known that I, SEATON H. WADE, of Chapel Hill, in the county of Hinds, and in the State of Mississippi, have invented certain new and useful Improvements in Cotton-Planting Attachments to Harrows; and do hereby declare that the following is a full, clear, and exact description thereof, reference being had to the accompanying drawings, and to the letters of reference marked thereon, making a part of this specification.

My invention relates to an improvement in the planting attachment for harrows patented to one Wm. J. Covington, dated December 22, 1874, and No. 158,040; and it consists in combining with a V-shaped harrow a detachable hopper and a detachable spiked cylinder, all as more fully hereinafter set forth.

In order to enable others skilled in the art to which my invention appertains to make and use the same, I will now proceed to describe its construction and operation, referring to the annexed drawing, in which—

Figure 1:
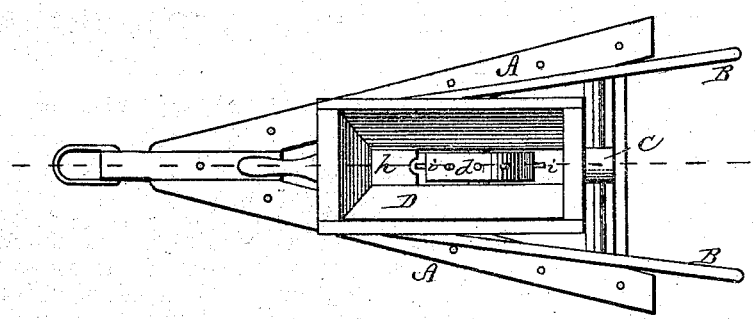
Figure 2:
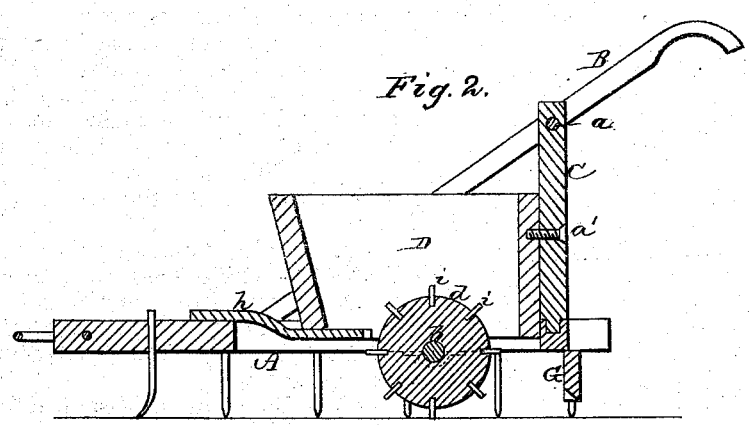

Figure 1 is a plan view of a harrow with my cotton-planter attached thereto. Fig. 2 is a longitudinal vertical section of the same.

A represents an ordinary triangular harrow, with handles B B fastened to the harrow, and connected by a round, a, which passes through a post, C, rising from the rear part of the harrow. My cotton-planting attachment to be affixed to this harrow consists of a hopper, D, having flaring or inclined sides, placed so that its front end will rest between and against the beams of the harrow, and its rear end fastened to the post C by a single screw or bolt, a'. Across the under side of the harrow-frame is a shaft, b, held in suitable boxes attached to said frame, and on this shaft is secured a wheel, d, provided with teeth or pins i, projecting radially from the circumference thereof, which wheel extends up into the hopper D through a slot in its bottom.

In operation the pins i catch in the ground and revolve the wheel d, so as to stir the seed in the hopper, and carry it out by the pins. The amount of seed thus carried out is easily regulated by means of a slide, h, in the bottom of the hopper. The seed is covered by a covering-bar, G, attached to the rear teeth of the harrow.

I do not, broadly, claim combining detachable planting attachments with a harrow-frame, as I am aware that such is not new.

Having thus fully described my invention, what I claim as new, and desire to secure by Letters Patent, is—

In combination with a V-shaped harrow-frame, the detachable hopper D, wedged in between the bars of the frame at its front, and secured to the upright C at its rear by the screw a', and the detachable wheel d, with pins i, all as set forth.

In testimony that I claim the foregoing I have hereunto set my hand this 22d day of December, 1874.

SEATON H. WADE.

Witnesses:
 JOHN TERRY,
 J. E. WADE.